July 4, 1939.  W. KAFKA  2,165,055

DRY RECTIFIER PLANT

Filed April 28, 1938

WITNESSES:
Wm. B. Sellers.
R. W. Bailey

INVENTOR
Wilhelm Kafka.
BY
F. W. Lyle.
ATTORNEY

Patented July 4, 1939

2,165,055

UNITED STATES PATENT OFFICE 2,165,055

DRY RECTIFIER PLANT

Wilhelm Kafka, Berlin-Siemensstadt, Germany, assignor to Westinghouse Electric & Manufacturing Company, East Pittsburgh, Pa., a corporation of Pennsylvania Application April 28, 1938, Serial No. 204,721
In Germany June 29, 1937

1 Claim. (Cl. 175—363)

The invention relates to rectifier systems and especially to a plurality of copper oxide rectifiers connected in parallel.

An object of the invention is to prevent overloading of one or more of a plurality of rectifiers connected in parallel in a rectifier system.

Figure 1:
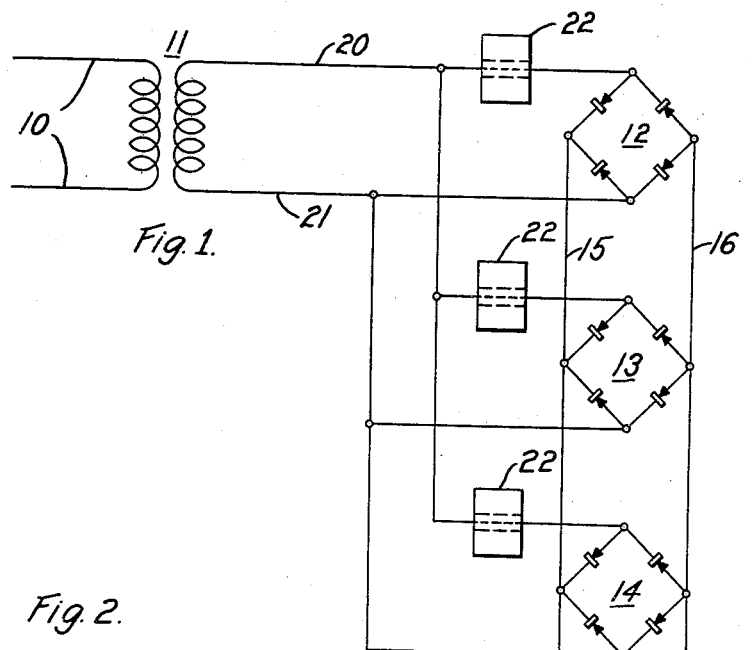
Figure 2:
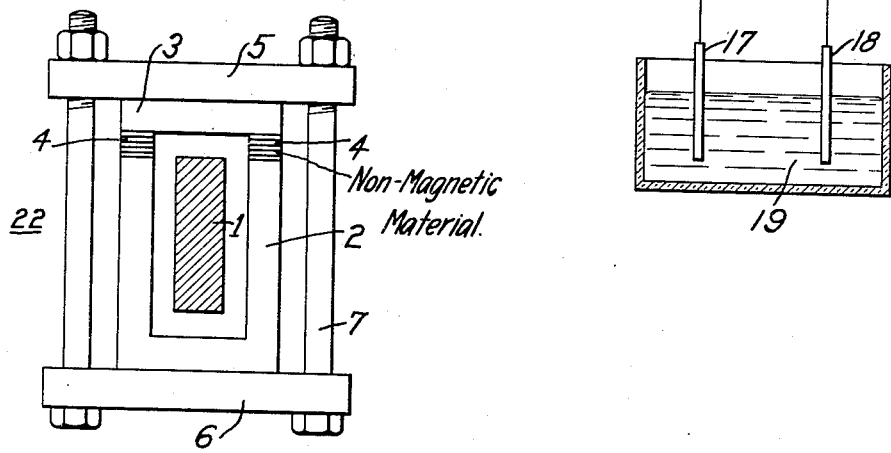

Other objects and advantages will be apparent from the following description and drawing, in which Figure 1 is a diagrammatic circuit illustrating an application of the invention; and, Fig. 2 is a view partly in cross section and partly in elevation of a preferred device applied to the circuit disclosed in Fig. 1.

Certain applications of rectifiers require extraordinary large currents while the potential is customarily only that of several volts. Such applications are those providing direct current for feeding galvanic or electrolytic baths. The currents utilized may be that of thousands or even tens of thousands of amperes. It is usual to build the rectifier elements such as the copper oxide discs into structural units, each unit representing a complete rectifier which has its own housing and its own cooling device. Where large currents are required, however, a single unit does not suffice for the feeding of the circuit, but several units must be connected in parallel and they are fed either from a common transformer or each has a separate transformer. In view of the extraordinarily small network potential, such an arrangement easily results in a non-uniformity in the load distribution in the parallel connection of the plurality of units because of unequal potential drops in the transformers, the conductor leads and the rectifiers themselves. With dry rectifiers, such as the copper oxide type, the situation is still more serious because of their negative temperature coefficient. If one rectifier unit or bridge has a lower resistance, it will take a higher loading than the others and because of the negative temperature coefficient, the higher loading will increase the temperature and still further decrease the resistance with the result that this unit or bridge will take still more of the load and become overloaded. This unstable condition may lead to the destruction of the rectifier elements of that particular unit or bridge.

The invention contemplates equalizing the loading between the parallel operating dry rectifying units. Specifically, the invention contemplates providing adjustable or displaceable iron cores enclosing the connecting conductors between the transformer and the rectifier. These cores will be magnetized by the magnetic field surrounding the conductors and the inductance will react upon these connecting conductors. In this manner, it is possible to adjust the potential drop of one or more of the units artificially and thereby to compensate any non-uniformities in the inductances and the ohmic resistors. Preferably, the iron cores are so designed that they form about the conductors a completely closed magnetic circuit which is interrupted only by an adjustable air gap.

In Fig. 1 is disclosed an alternating current source 10 feeding through a transformer 11, a plurality of rectifier units or bridges 12, 13 and 14. These units or bridges may be of the familiar copper oxide rectifier type. These units are connected by leads or bus bars 15 and 16 to the load which may be the electrodes 17 and 18 immersed in the electrolytic bath 19. About one of the connections 20 and 21 to the unit 12 may be placed an adjustable iron core 22 whose preferred construction is illustrated in Fig. 2. This adjustable iron core may be placed about one or both leads of any or all of the units. It is, of course, important to surround one of the leads to the unit or bridge having the lowest resistance.

In Figure 2, the numeral 1 identifies the cross section through a connecting bus between the transformer and the rectifier. The magnetic core enclosing the buses or bars consists of the U-shaped portion 2 and a closing yoke 3. Both of these are preferably built of thin laminations insulated from each other. The closing yoke 3 preferably does not lie directly on the leg ends of the portion 2, but a non-magnetic intermediate layer 4 of some insulating material is provided between the two. This material is preferably compressible under pressure but stiff enough to maintain a spaced adjustment between the legs and yoke. Instead of compressible material, the air gap between the portion 2 and its yoke 3 may be adjusted by inserting a greater or less number of stiff non-magnetic layers. The whole arrangement is held together by two press yokes 5 and 6 which are connected with each other by screw bolts 7. To avoid eddy currents, these parts are preferably constructed, at least partially, of non-magnetic materials.

It is apparent that many modifications may be made in the preferred embodiment described and illustrated. Accordingly, it is desired that only such limitations be placed on the following claim as are necessitated by the prior art.

I claim as my invention:

In combination, a plurality of rectifiers connected in parallel, a source of alternating current, bus bars connected to said rectifiers and to said source of alternating current, an iron core about at least one of said bus bars comprising a U-shaped portion and a closing yoke and compressible non-magnetic material between the yoke and the leg ends of the U-shaped portion.

WILHELM KAFKA.